United States Patent [19]

Archer et al.

[11] Patent Number: 4,833,623
[45] Date of Patent: May 23, 1989

[54] ORIFICE PLATE INSPECTION APPARATUS AND METHOD

[75] Inventors: Timothy H. V. Archer, Centerville; Roger C. Burchett, Miamisburg; John L. Dressler, Spring Valley; Greg S. Wood, Dayton, all of Ohio

[73] Assignee: Burlington Industries, Inc., Greensboro, N.C.

[21] Appl. No.: 76,158

[22] Filed: Jul. 21, 1987

[51] Int. Cl.$^4$ ............................................. G06F 15/46
[52] U.S. Cl. .................................... 364/507; 364/560; 250/560; 356/239; 356/384
[58] Field of Search ............... 356/239, 240, 435, 384, 356/378, 379, 387; 250/225, 560; 364/507, 473, 560, 525, 563, 564

[56] References Cited

U.S. PATENT DOCUMENTS

| | | | |
|---|---|---|---|
| 3,746,455 | 7/1973 | Flamholz | 356/378 |
| 3,963,348 | 6/1976 | Nakatani et al. | 250/225 |
| 4,037,968 | 7/1977 | King et al. | 250/560 |
| 4,171,158 | 10/1979 | Malvick et al. | 356/239 |
| 4,296,474 | 10/1981 | Hurt | 364/560 |
| 4,492,475 | 1/1985 | Takahashi | 356/240 |

FOREIGN PATENT DOCUMENTS 2124761 2/1984 United Kingdom ................ 356/379

Primary Examiner—Parshotam S. Lall
Assistant Examiner—Ellis B. Ramirez
Attorney, Agent, or Firm—Nixon & Vanderhye

[57] ABSTRACT

The fluid jet applicator orifice plate inspection apparatus provides an optoelectronic inspection system including a laser light source and an optical detector mounted on a carriage for traversing an orifice plate to cause laser light to pass through the orifices one at a time for detection on the other side of the orifice plate by an optical detector. The intensity of the detected light is proportional to the area of an individual orifice through which the laser light has been transmitted. The detector generates light intensity signals which are proportional to the area of the orifices and which signals are processed, digitized, and further processed by a data processor to determine, for example, the relative sizes of the orifices along the plate, the orifice size distribution along the plate and flaws of the individual orifices.

55 Claims, 9 Drawing Sheets

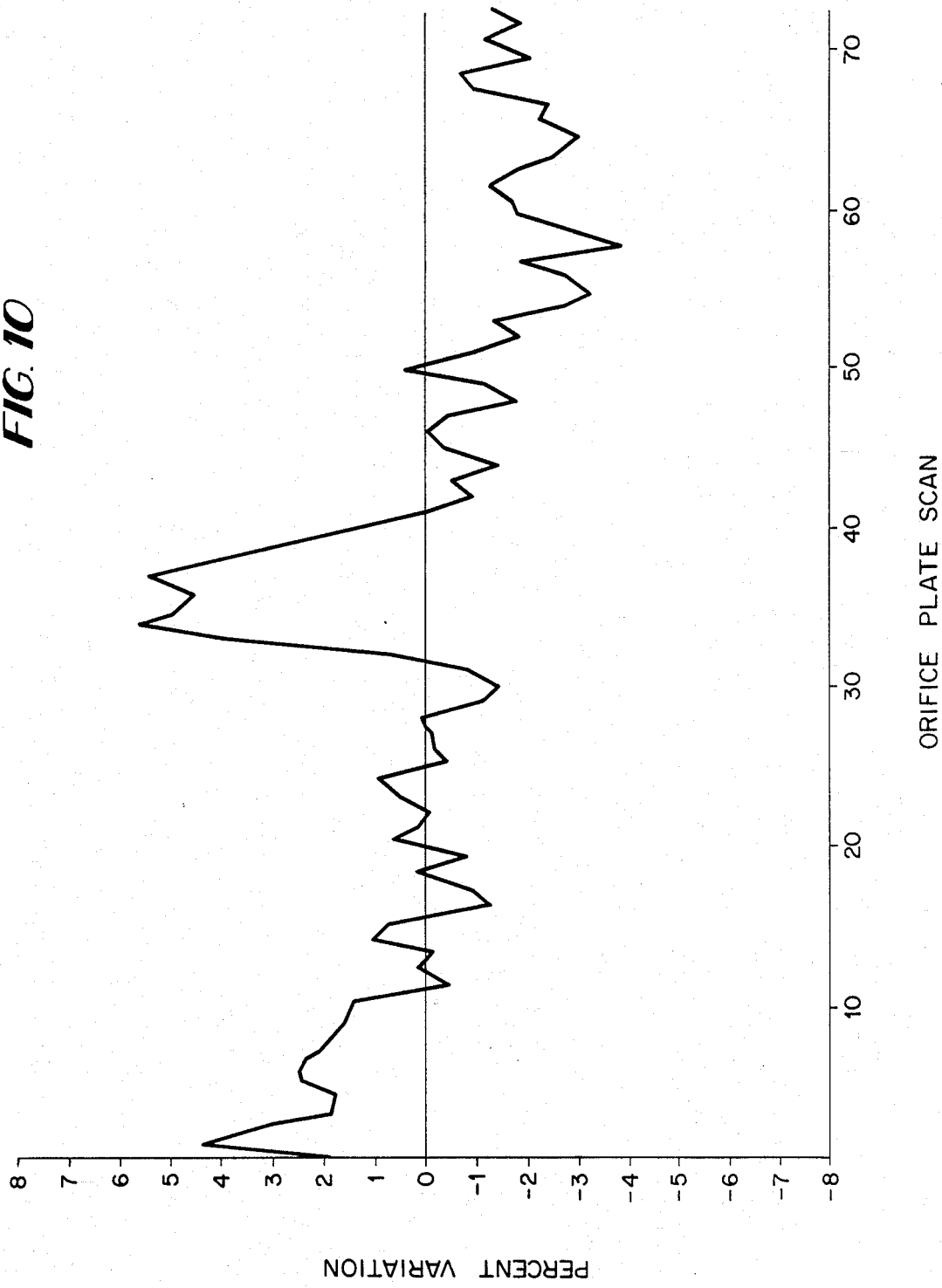

ORIFICE PLATE INSPECTION APPARATUS AND METHOD

BACKGROUND AND SUMMARY OF THE INVENTION

The present invention relates to apparatus and methods of inspecting the orifice plates used in fluid jet devices for purposes of determining orifice dimensional characteristics. More particularly, the present invention relates to an optoelectronic system for determining the relative sizes of the orifices, the distribution of the orifice sizes along the length of the orifice plate, and flaws in individual orifices.

In fluid jet printing, an orifice plate is disposed below a distribution bar having a plenum whereby fluid flows from the plenum through the orifices of the orifice plate for deposition on a substrate. Generally, filaments formed as the fluid emerges from the orifices are selectively charged by a charge electrode. The droplets formed by the filaments flow through an electrostatic field provided by a deflection electrode. The charged droplets are displaced from a straight downward path by the electrostatic field onto a catched structure, whereas the uncharged droplets flow straight downwardly for deposition on the substrate, e.g., a textile fabric.

With the evolution of fluid jet printing and applicators, the size of the orifices has become a critical factor for achieving precise control over the patterns provided on a substrate, for example, a textile fabric about 1.8 meters in width. In pattern-generating fluid jet printing devices for textile fabrics, a 72" orifice plate may have 72 or 144 orifices per inch for a total of 5,063 or 10,126 holes over its length, respectively. The orifices are nominally in the 1-4 mil size range. The specific orifice size is dependent on the end use of the orifice plate, and for optimum flow characteristics, the variation in the orifice area should not exceed about $\pm 1178$ %.

For high resolution, for example when creating patterns in fabrics, it is essential that the orifice size, i.e., orifice area, be uniform throughout the length of the plate within the above-mentioned tolerance range. Inspection of orifice plates and particularly the size of the orifices to determine whether the orifices lie within this tolerance range, is a tediuous, time-consuming and error-prone process when done conventionally by inspection of the orifices through a microscope. More importantly, size errors are of such small magnitude as to be below the diffraction limit of light microscopes. Microscopes, moreover, do not enable the determination of whether the orifices are out-of-round, or otherwise irregularly shaped.

The present invention provides apparatus and methods for automatically inspecting the orifices of the orifice plate to determine the relative areas of the orifices, the distribution of the orifice sizes along the length of the orifice plate and to detect flaws in individual orifices. To accomplish this, the present invention provides a support frame on which the orifice plate is mounted. A carriage is mounted on the support frame for movement longitudinally therealong on suitable guide rails. In a preferred form, an endless belt and pulley arrangement is provided to move the carriage back and forth along the support frame and hence to traverse the length of the orifice plate. The carriage carries as part of an optoelectronic inspection system, a laser light source on one side of the orifice plate and an optical detector on the opposite side of the orifice plate whereby the laser light beam passes through the orifices for detection by the detector one after the other as the carriage traverses the length of the orifice plate. The intensity of the detected light is proportional to the area of the individual orifice through which the laser light has been transmitted. Thus, the detector generates light intensity signals which are proportional to the area of the orifices and which signals are processed, digitized, and further processed by a data processor to determine orifice size distribution along the plate and flaws of the individual orifices. While the present invention is herein described using a laser as the energy transmitting source and an optical detector as the energy receiving detector, it will be appreciated that the energy source and detector could be other types of energy transmitting sources and receivers, respectively, for example of the electromagnetic radiation type.

In accordance with the present invention, there is provided apparatus for determining a dimensional characteristic of orifices in an orifice plate useful for fluid jet printing comprising means for mounting an elongated orifice plate, optical light emitting and detection means including a light source on one side of the orifice plate for directing light through the orifices thereof and a light detector on the opposite side of the orifice plate from the light source for receiving light directed through the orifices by the light source. Means are additionally provided for effecting relative movement of the optical means and the mounting means for directing light through the orifices for detection by the detector. The light detector is operable to generate signals proportional to the intensity of the received light, and means for processing the signals to determine the dimensional characteristic of the orifices are provided.

In another aspect of the invention, there is provided apparatus for automatically determining the uniformity of the apertures in a member having an array of apertures comprising holding means for disposing an energy source adjacent the array of apertures, means for moving the apertures relative to the energy source, means for sensing the amount of energy passing through the apertures and for generating electrical signals indicative thereof, and processing means responsive to the electrical signals for generating signals indicative of the degree of uniformity of the apertures in the array.

In a further aspect of the present invention, there is provided a method for determining a dimensional characteristic of an orifice in an orifice plate useful for fluid jet printing including the steps of disposing a light source on one side of the orifice plate for directing light through an orifice thereof, disposing a light detector on the opposite side of the orifice plate for detecting light passing through the orifice from the light source, generating an electrical signal proportional to the intensity of the detected light and processing the electrical signal to determine the dimensional characteristic of the orifice.

A still further aspect of the present invention provides a method for automatically determining in a measurement system the uniformity of the apertures in a member having an array of apertures comprising the steps of disposing an energy source adjacent the array of apertures, moving the apertures relative to said energy source, sensing the amount of energy passing through the aperture and generating electrical signals indicative thereof, and processing the electrical signals to generate signals indicative of the degree of uniformity of the apertures in the array.

Accordingly, it is a primary object of the present invention to provide novel and improved apparatus and methods for inspecting an orifice plate useful in jet printing devices for purposes of determining the relative sizes of the individual orifices, the distribution of the orifice sizes along the length of the orifice plate and flaws in individual orifices.

These and further objects and advantages of the present invention will become more apparent upon reference to the following specification, appended claims and drawings.

BRIEF DESCRIPTION OF THE DRAWING FIGURES

FIG. 10 is an exemplary plot of the percentage deviation of orifices from an average orifice size distributed along the length of an orifice plate.

DETAILED DESCRIPTION OF THE DRAWING FIGURES

Reference will now be made in detail to the present preferred embodiment of the invention, an example of which is illustrated in the accompanying drawings.

Figure 1:
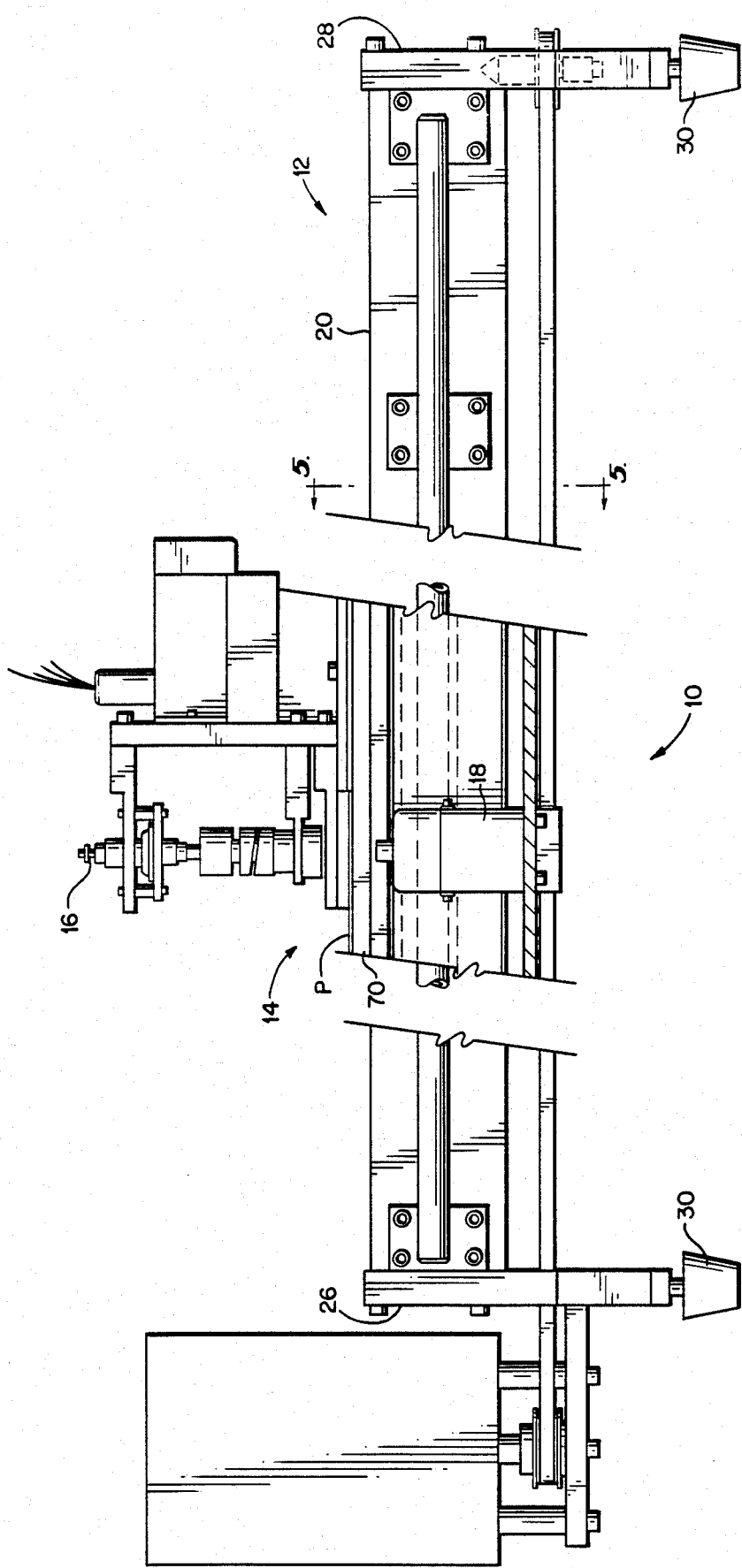
FIG. 1 is a side elevational view with portions broken out illustrating an orifice plate inspection apparatus constructed in accordance with the present invention.

Referring now to FIG. 1, there is illustrated an inspection apparatus constructed in accordance with the present invention and generally designated 10. Inspection apparatus 10 includes a support frame and carriage, generally designated 12 and 14, respectively. Carriage 14 is mounted for movement along the length of frame 12 and carries a laser light source S and a detector 18.

Figure 3:
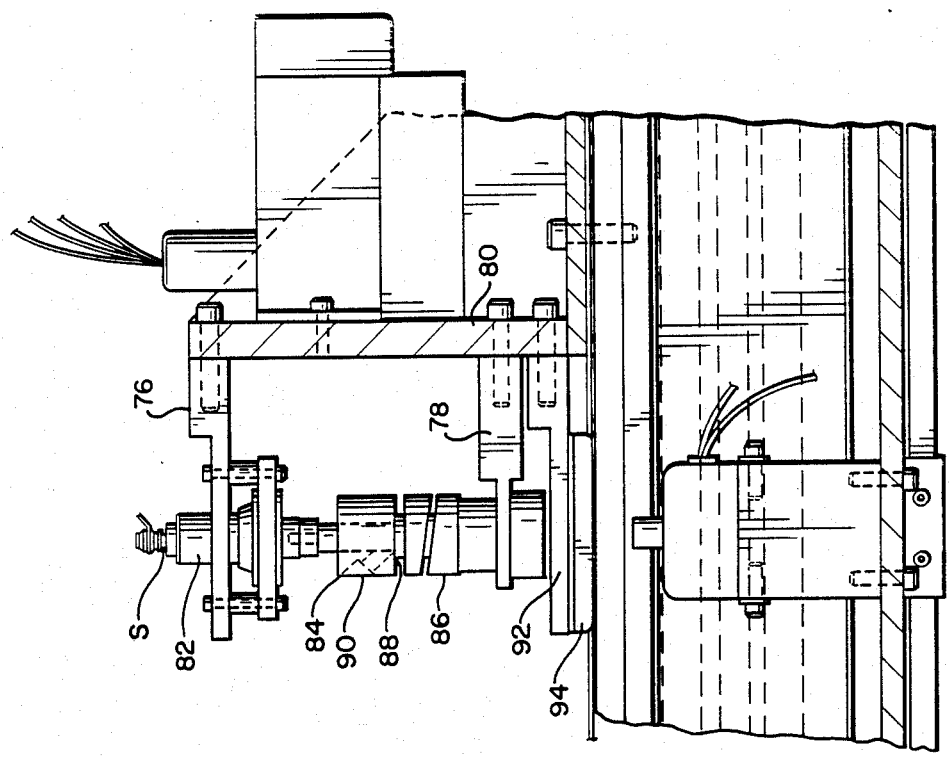
FIG. 3 is an enlarged fragmentary cross-sectional view of the inspection apparatus of FIG. 1 illustrating the carriage mounted on the support frame of the apparatus.
Figure 2:
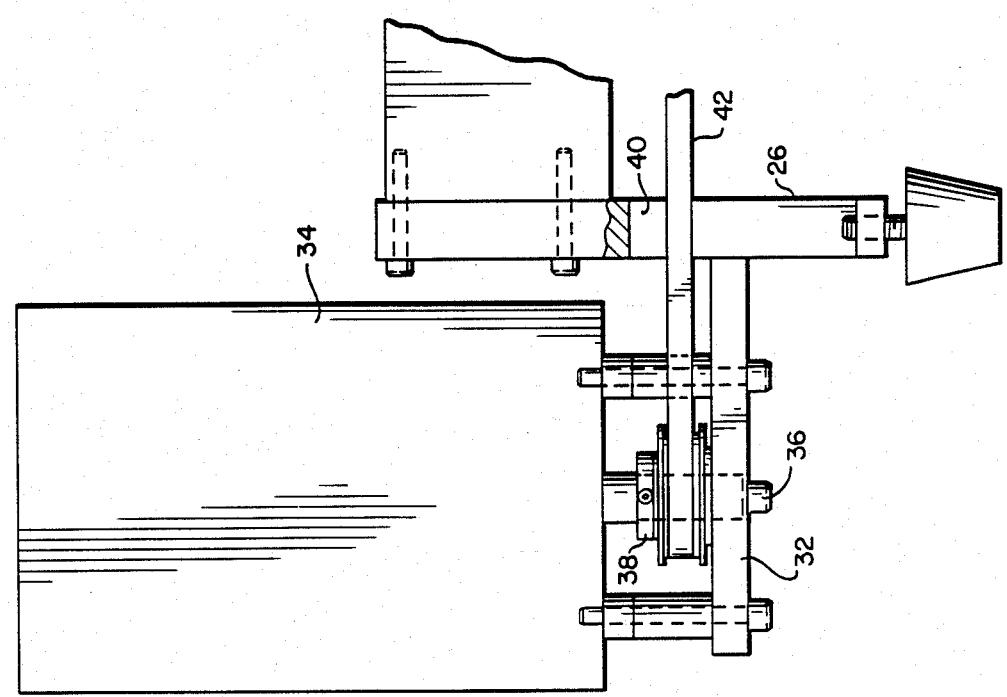
FIG. 2 is an enlarged fragmentary side elevational view with portions in cross-section of the left-hand end of the inspection apparatus illustrated in FIG. 1.
Figure 4:
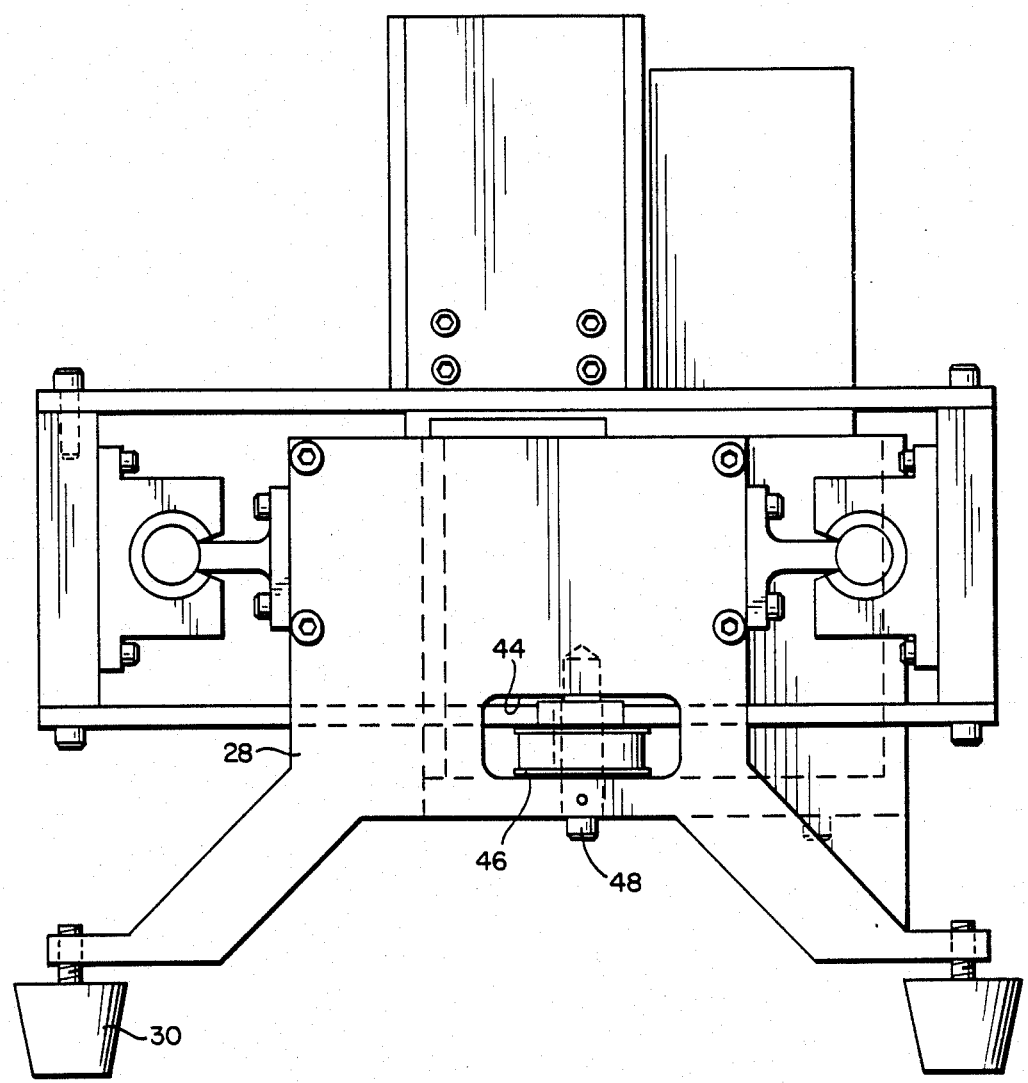
FIG. 4 is an enlarged end elevational view of the inspection apparatus illustrated in FIG. 1 and looking from right to left in FIG. 1.
Figure 5:
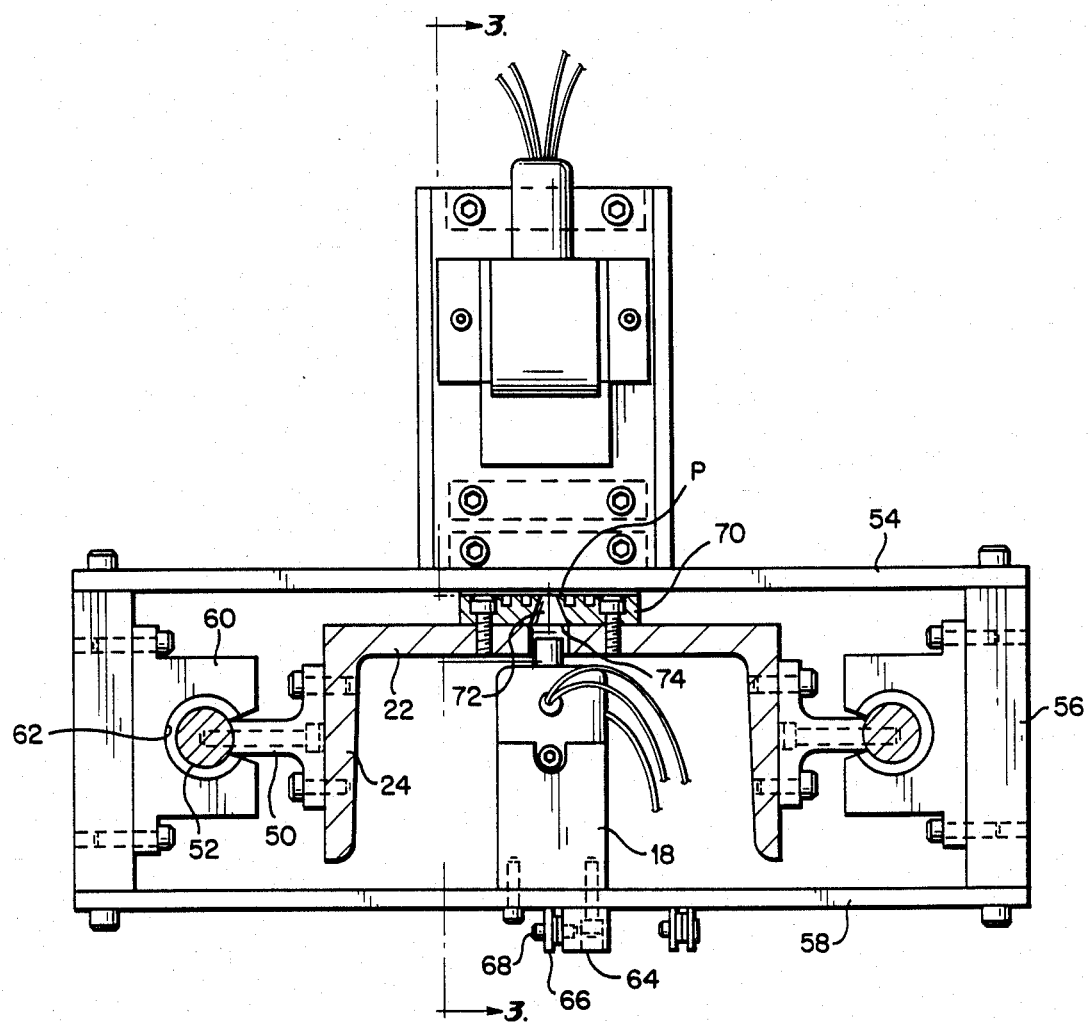
FIG. 5 is an enlarged cross-sectional view of the inspection apparatus hereof taken generally about on line 5—5 in FIG. 1.

With specific reference to FIG. 1, 3 and 5, support frame 12 includes an elongated, inverted, substantially channel-shaped, support member 20, having a base 22 and depending side walls 24. Opposite ends of member 20 are secured to upstanding end plates 26 and 28 at respective opposite ends of frame 12, each of end plates 26 and 28 having supporting feet 30. Referring to FIG. 2, end plate 26 supports a carriage drive assembly including a mounting plate 32 on which a motor 34 is carried, the driveshaft 36 of which is coupled to a pulley 38. An opening 40 is provided through end plate 26 and through which openings 40 passes a pulley belt 42 reaved about pulley 38 and extending the length of frame 12 to its opposite end. Referring to FIGS. 1 and 4, the opposite end plate 28 has an aperture 44 which receives an idler pulley 46 mounted for rotation about a pin 48 secured in end plate 28. Belt 42 is disposed about idler pulley 46. As illustrated, belt 42 extends below member 20 and carriage 14.

Mounted along the external surfaces of the legs 24 of member 20 and projecting laterally outwardly therefrom are a plurality of support elements 50 at longitudinally spaced positions along frame 12. Support elements 50 mount a longitudinally extending guide rail or guideway 52 along each of the opposite sides of member 20. The guide rails 52 support carriage 14 for longitudinal sliding movement along the length of support frame 12.

Carriage 14 includes carriage top, side and bottom walls 54, 56 and 58, respectively, which substantially surround support frame 12 and the guideways 52 caried thereby. Along the inside faces of side walls 56 are mounted a pair of bushing blocks 60 having complementary openings for receiving, with suitable bearing surfaces interposed, the guide rails 52. Carriage 14 is therefore mounted on support frame 12 for longitudinal sliding movement therealong for the full length of frame 12. To enable carriage 14 to traverse back and forth along support frame 12, belt 42 is secured in a slot between a mounting block 64 and a plate 66 in opposite thereto by means of a pair of bolts 68. Consequently, as drive motor 34 rotates pulley 38, belt 42 is longitudinally displaced along the underside of frame 12, causing carriage 14 to move with one side of belt 42 for traverse along the length of support frame 12.

Mounted along the top of support frame 12, particularly along the upper surface of base 20, there is provided an orifice plate support member 70, preferably bolted to base 20. Support member 70 has an elongated slot 72 which extends substantially the length of support frame 12 and is also provided with an upstanding pin, not shown, at one end. The orifice plate P (FIGS. 1 and 7) is disposed on the pin, the pin being received in a hole in the end of the orifice plate. The orifice plate, of course, extends along the upper surface of support member 72 such that the orifices through the plate are aligned with slot 72. The base 20 of support frame 12 also has an elongated slot 74 in registry with slot 72, the orifices in the orifice plate, the slot 72 in support member 70 and slot 74 in frame 12 forming a light path between the light source carried by the carriage and the light detector 18, also carried by the carriage.

Referring now particularly to FIG. 3, a pair of support plates 76 and 78 extend from an upstanding support member 80 mounted to the top wall 54 of carriage assembly 14. Support plates 76 and 78 support a scanning head including laser light source S and a focusing mechanism. The light source S is disposed in a focusing mechanism 82 and a diffusing mechanism 84 is provided in conjunction with a diffusing chamber 86. In the diffusing chamber 86, there is provided a frosted glass 88 for reflecting light back through a side monitoring exit 90. The light beam taken off through side exit 90 is applied through a variable aperture to a photodiode 110 (FIG. 6) to operate as a sampler to monitor the continuing output of the light source. The variable aperture is used to nearly match the magnitude of the transmitted beam with the reference beam. A lower plate 92 supported by upstanding element 80 carries a pair of inwardly biased spring-tensioned guides 94 adapted to engage the opposite side edges of the orifice plate when supported on the support member 70. In this manner, the orifice plate is continually centered over the center of the slot 72 in support member 70, it being appreciated that only one end of the orifice plate is secured to the support member 70 by means of the pin at the far end of the support frame 12. Consequently, light passing through an orifice plate P passes through slots 72 and 74 for detection by a photodiode 102 (FIG. 6) forming part of photodetector 18.

Figure 6:
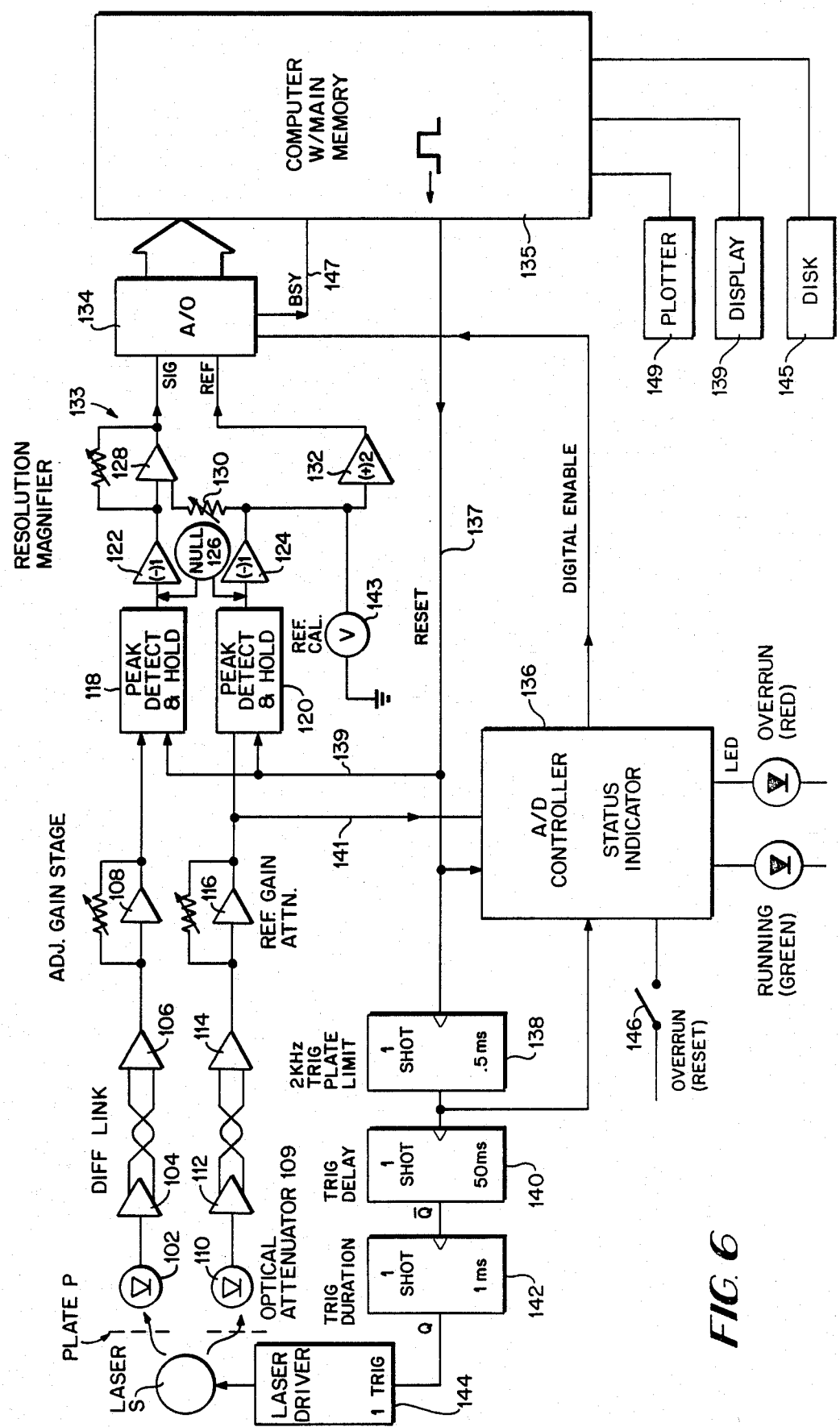
FIG. 6 is a schematic diagram illustrating an exemplary optoelectronic measurement system incorporated within the inspection apparatus hereof.

The optoelectronic measurement system for automatically inspecting and evaluating dimensional characteristics of the orifices in the orifice plates for fluid jet devices is schematically shown in FIG. 6. The exemplary optoelectronic orifice size measurement system shown in FIG. 5 is designed primarily to determine the degree of orifice uniformity in terms of the distribution of relative orifice sizes in the linear orifice array. As noted above, the optimum or desired orifice size is dependent on the application for which the orifice plate is being utilized. For optimum fluid flow characteristics in a solid shade fluid jet applicator, the variation in orifice area over the length of the orifice plate should not exceed about $\pm 1178$ %.

As noted above, the orifice size measurement system of the present invention includes optical detection apparatus that uses a laser light source S and an optical detector 18 that are disposed such that the laser light passes through one orifice in the linear array at a time. The light passing through an orifice is detected by the detector on the other side of the orifice plate. The intensity of the detected light is proportional to the area of the orifice through which it has been transmitted. Such light intensity signals are processed, digitized and then further processed by a data processor in a manner described in detail below.

Laser source S is a pulse laser having sufficient power to provide the intense illumination required to generate data which will accurately reflect the variations in orifice size. In this regard, laser S, in an exemplary embodiment, operates at a wavelength of 904 mm. Although having a peak power capacity of 210 watts, the laser is operated at a peak power of 75 to 80 watts/pulse. The pulse width is about 200 nanoseconds at 200 KHz and a 0.01% duty cycle.

A laser having these characteristics will assure that sufficiently intense light pulses of sufficient number pass through a given orifice so that the resulting data will be statistically significant. In this regard, for 1.3 mil orifice, the amount of light passing through this orifice will not generate statistically significant data unless an extremely intense beam is used. Pulse lasers provided the required intensity and also may provide pulsing at about 2,000 pulses per second. Thus, for example, for orifice sizes of 5 mils, where there is a 14 mil distance between hole centers and where the transport speed is 40 mils per second, approximately 125 pulses will be generated in the transmit time over one orifice. Thus, it is highly likely that a pulse will be transmitted as the source and detector are almost perfectly aligned with the center of the orifice under such circumstances.

In accordance with an exemplary embodiment of the present invention, light from laser S is transmitted to two channels, an orifice detecting channel and a reference channel. The orifice detecting channel and the reference channel each include identical photodiodes 102 and 110, respectively. Light detected by photodiode 102 is transmitted by laser S through an orifice in orifice plate P and slots 72 and 74.

In contrast, light transmitted to photodiode 110 does not first pass through orifice plate P. Photodiode 110 is disposed in the side monitoring exit 90 of the laser mounting assembly, as shown in FIG. 3 above. Light from laser S first passes through a calibrating optical attenuator 109 before being detected by photodiode 110.

The hole detecting and reference channels shown in FIG. 6 from photodiode 102 to amplifier 122 and from photodiode 110 to amplifier 124, respectively (which will be described below), are two identical channels for processing the electrical signals generated by the photodiodes. The electrical signals generated by photodiode 102 are proportional to the light intensity of the optical pulses passing through the orifice plate.

The reference channel provides a mechanism for monitoring the laser output and for calibrating and normalizing the measurement system with respect to an orifice having known or predetermined reference dimensions. The reference and hole detecting channels are initially calibrated such that for a predetermined reference orifice equal signal values are obtained at corresponding points along the channels.

In initially calibrating the hole detecting and reference channels, a laser S is placed over a reference orifice. Gain stage 108 is then adjusted to any predetermined desired mid-range gain point. Similarly, the reference gain stage 116 is set to a corresponding gain as its orifice detector channel counterpart. Thereafter, an optical attenuator 109, which is disposed between the laser S and reference detector 110, is adjusted such that an equal voltage reading is achieved for both paths as determined by a null reading from a voltage comparison at 126, which may be taken, for example, at the output of peak detectors 118 and 120. In order to permit calibration in the middle of the system's operating range during calibration, the system is set to a mid-range operating point by a reference voltage source 143, which may, for example, be a 5V source.

In an alternative embodiment, calibration is accomplished using a coarse calibrating step followed by a fine tuning calibrating step. In this regard, the output of the adjustable gain stage 108 is first compared with the output of the reference gain stage, for example, by using an oscilliscope disposed at the output of detectors 118 and 120. Thereafter, the optical attenuator 109 adjusted until the output voltages of stages 108 and 116 are identical.

Digital computer 135 is then used for finer calibrating adjustments. Associated with digital computer 135 is a CRT display 139 which is controlled to display an eight bit orifice size deviation word, where eight "0's" indicate a full-range deviation minimum, eight "1's" indicate a full-range deviation maximum and "10000000" indicates the null point where there is no deviation. Thus, by viewing the digital output of the digital computer 135, the operator may make fine adjustments using the optical attenuator 109 until the precise null point is reached.

After the system has been calibrated by being set to this null point, then the linear array is scanned. Thereafter, every orifice in the orifice array is measured with respect to the first measured calibration point.

As noted above, scaling and calibration of the present system is such that an equal voltage reading for both channels generates a digital word at the output of analog to digital converter 134 which is mid-range between an all "0" minimum and a full-range deviation of all "1's". After this initial calibration, any deviation from a null or equal voltage reading in the two channels indicates an orifice which varies from the reference or nominal desired orifice size. If the orifice detected is larger than the reference orifice size, then the digital word generated by the system will be correspondingly larger. On the other hand, if the orifice detected is smaller than the reference orifice size, then the digital output will be correspondingly smaller.

Turning back to FIG. 6, the output from the orifice detectors 102 and 110 are very low level signals due to the very small holes in the orifice plate and the correspondingly small amount of light which passes through the holes. Preamplifiers 104 and 112 are disposed adjacent to the detectors 102 and 110, respectively, to boost the detected signal from a signal on the order of less than 100 microvolts to several hundred millivolts. In each channel, this amplified signal is driven over a conventional twisted pair into a main processing enclosure wherein there is disposed receiver amplifiers 106, 114. This amplifier configuration achieves good noise rejection so that the detected signals can be accurately tracked. Thus, the preamplifiers and twisted pairs serve to amplify the low-level signals and transmit such signals to channel processing sections keeping noise to a minimum.

The adjustable gain stages 108 and 116 further amplify the output from 106 and 114, respectively, such that a 5 volt peak signal is generated. As noted above, the adjustable gain stage serves to normalize the detected signal depending upon a nominal or reference orifice size. More particularly, for a nominal orifice size of 1 mil, the adjustable gain stage is adjusted to produce a 5 volt peak signal. If the nominal orifice size is 2 mils, then the gain of the adjustable gain stage will be cut by a factor of 2 in order to also generate a 5 volt peak signal. The gain adjustment in 108 and 116 for the respective orifice sizes of 1 mil, 2 mil, 3 mil or 4 mil is modified using a conventional stepped switch.

The output from gain stages 108 and 116 are applied to peak detectors 118 and 120. The peak detectors 118 and 120 sample and hold the highest values output from gain stages 108 and 116 for 70 microseconds; a time period long enough for the downstream analog to digital converter 134 to digitize the detected signals. As the detector moves along underneath the orifice plate, light passes through the orifices, generating peaks of light at a rate of 2 KHz. When the orifices becomes completely illuminated, the highest peak voltage will be reflected at gain stages 108 and 116.

The output of the peak detectors 118 and 120 are amplified by amplifiers 122 and 124 and transmitted to analog to digital converter 134 via reference setting circuitry 132, 130 and resolution magnifier 133. The reference setting circuitry ensures that the A to D converter 134 is set so that the reference point or point of zero deviation from the nominal orifice size is indicated by the half-scale point generated by the A to D converter 134.

Focusing on the reference channel, the output of peak detector 120 is applied to −1 gain amplifier 124, whose output is fed to a +2 amplifier 132, which is applied to the reference input of the A to D converter. If the reference voltage and the signal voltage inputs to A to D converter 134 are equal, then the A to D converter generates all 1's. If the signal voltage is zero, on the other hand, then the A to D converter generates all 0's. By inserting the +2 gain stage 132 between the peak detector 120 output and the A to D convertor, the system is set such that the point of zero deviation from the nominal orifice size is indicated by a ½-scale reading from the A to D convertor of 10000000, i.e., half-way between 00000000 and 11111111 readings. A to D converter 134 is a conventional A to D converter and may, for example, be of the type manufactured by Analog Devices, Inc. and sold as Model No. 7545.

Resolution magnifier 133 amplifies the difference between the reference channel signal and the orifice detector channel signal. This amplified signal is applied to the signal input of A to D converter 134 and serves to expand and magnify the measurement scale so that very small differences in orifice size may be meaningfully analyzed. As shown in FIG. 6, the output of reference channel amplifier 124 is transmitted through an offset gain element 130 to the non-inverting input of operational amplifier 128.

The gain of the resolution magnifier 133 is set by adjusting the feedback loop to the inverting input of operational amplifier 128. In this manner, small differences between the reference channel voltage and the orifice detector channel voltage are magnified. The resolution magnifier 133 magnifies the analog voltage 1, 5, 10, 20 or 50 times. This amplification allows full-scale orifice size measurement ranges of $\pm 100\%$, $\pm 20\%$, $\pm 10\%$, $\pm 5\%$ and $\pm 2\%$ of the nominal orifice size, respectively.

If the resolution magnifier gain is changed, a corresponding offset adjustment must be made at offset gain element 130, so that a 5 volt signal out of adjustable gain devices 108 and 116 still represents the peak nominal hole size value. The resolution magnifier 133 provides an effective mechanism for taking a close look at very small errors in uniformity in hole size.

Data from A to D convertor 134 is fed to the digital computer 135 which by way of example only, may be a Commodore 64. Recorded in digital computer 135 is a threshold signal level which corresponds to the level at which the optical scanning head must be past the orifice (which then indicates that the optical scanning head is between orifices). The computer 135 monitors the data at the output of A to D converter 134 and stores in, for example, disk memory 145, orifice size related values in a manner to be described below with regard to the flowcharts shown in FIGS. 7 and 8.

When the A to D converter 134 starts its conversion, it generates a "busy" signal on line 147, which line computer 135 monitors. The "busy" signal instructs computer 135 to wait until the busy signal is off before reading the converter output to thereby give A to D converter 134 sufficient time to complete its conversion.

When the computer 135 has completed storing the digital word from A to D converter 134, it transmits a pulse on the reset line 137. The pulse on reset line 137 serves to clear the peak detectors 118, 120 via line 139 so that the further data may be received. Additionally, the pulse on reset line 137 serves to trigger the laser via timing elements 138, 140, 142 and laser driver 144 (which will be discussed further below).

The A to D controller 136 receives an input signal from the reference channel via line 141 whenever a pulse is transmitted from reference detector 110. The A to D controller 136 also receives the reset signal which serves to set a latch (not shown) in the controller 136. Upon receiving the signal from the reference channel, A to D controller 136 transmits a "digitize enable" signal to A to D converter 134 which enables converter 134 to digitize received signals.

A to D controller 136 is also connected to monitor the timing chain at the output of one shot 138. By this connection, controller 136 may be used to determine whether an error condition is present such that data cannot be gathered as fast as it is being generated. If such a condition is detected, an overrun error light may be energized. To reset the system, overrun switch 146 may be closed. Under normal conditions, the carriage is run at a speed so that the overrun condition cannot take place. Nevertheless, it is possible that if a defective orifice plate has finely-spaced holes due to cracks, the overrun indicator may be used to indicate such an error condition.

Turning back to timing chain elements 138, 140 and 142, the one shot 138 ensures that the laser 100 is limited to a 2 KHz trigger rate. If the laser 100 is triggered at faster rates, the required power for proper operation may not be maintained. The trigger delay 140 prevents the laser 100 from being triggered before the A to D controller 136 transmits the "digitize enable" signal to the A to D converter 134. The trigger duration one-shot 142 ensures proper triggering of the laser driver. The precise firing duration is determined by the laser and laser driver circuit utilized. The laser driver 144 is a conventional laser driver which may, for example, be a M/A COM.

Focusing on the operation of data processor 135, besides generating the aforementioned reset signals, data processor 135 stores and processes the digital data received from analog to digital converter 134. As noted above, the processor stores a threshold signal level which corresponds to the level at which the optical scanning head must be past a given orifice. If five consecutive pulses are detected which are greater than the stored threshold level, then the sixth pulse is stored. All subsequent pulses which are greater than the immediately preceding pulse are likewise stored until there are five consecutive decreases in pulse intensity, thereby indicating the approach of the edge of the hole. As will be explained in detail below, this analysis ultimately results in the storage of the peak pulse for each orifice in the array.

As will be appreciated by those skilled in the art, the data so stored can be manipulated in numerous ways. The peak pulse for a given orifice is indicative of the area of the hole and a relative hole size may be determined therefrom. Moreover, if the reference hole used to initially calibrate the system is of a precisely known size, then those skilled in the art will recognize that such data can be used to determine absolute orifice size. Alternatively, the peak pulse and several preceding and trailing pulses can be evaluated and at least squared errors routine may be used to provide a relative hole size value. The resulting hole size may then be stored along with hole sizes for the other holes in the orifice plate.

Figure 7:
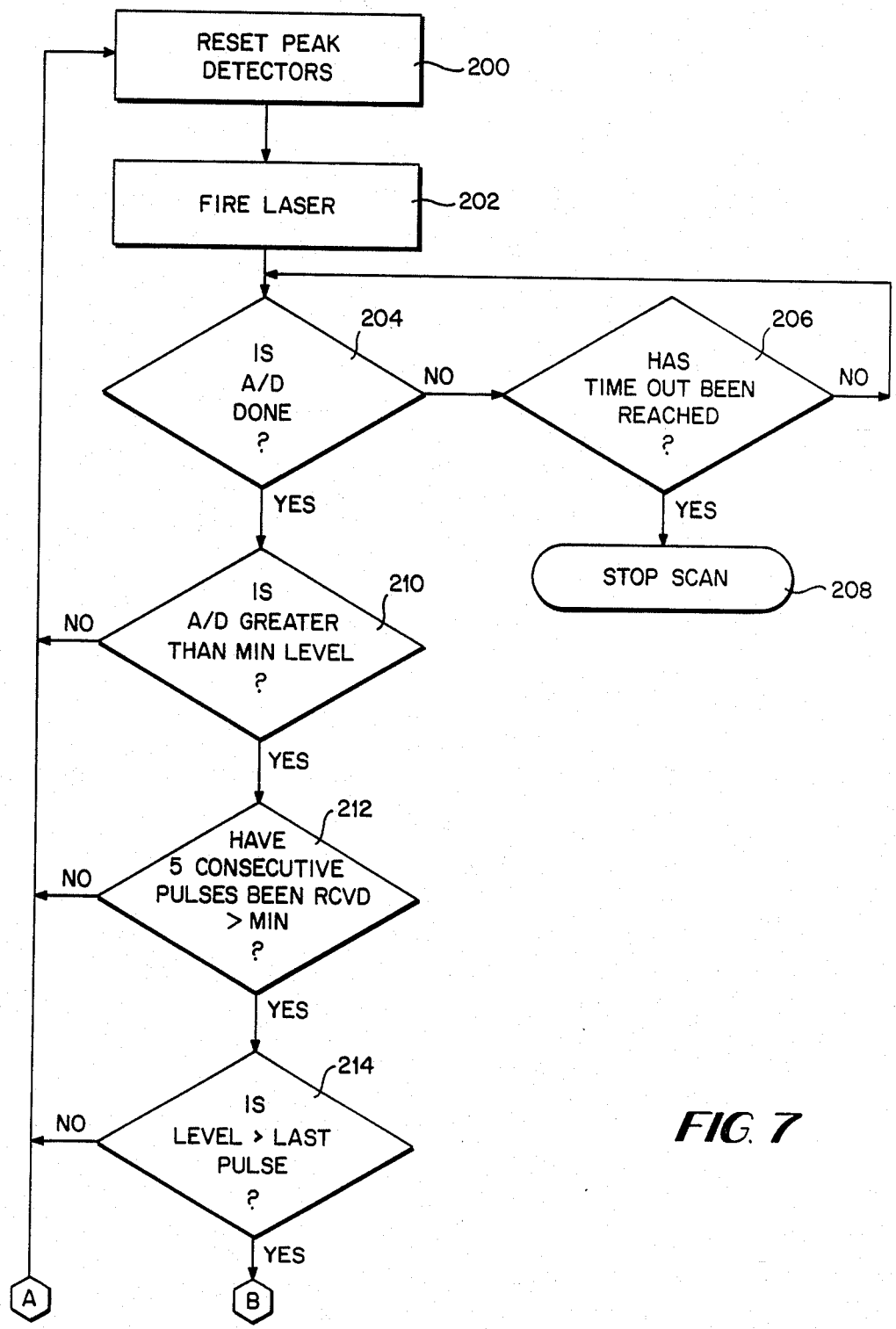
FIGS. 7 and 8 are flowcharts which generally depict the sequence of operations performed by the system data processor in controlling the optoelectronic measurement system shown in FIG. 6.
Figure 8:
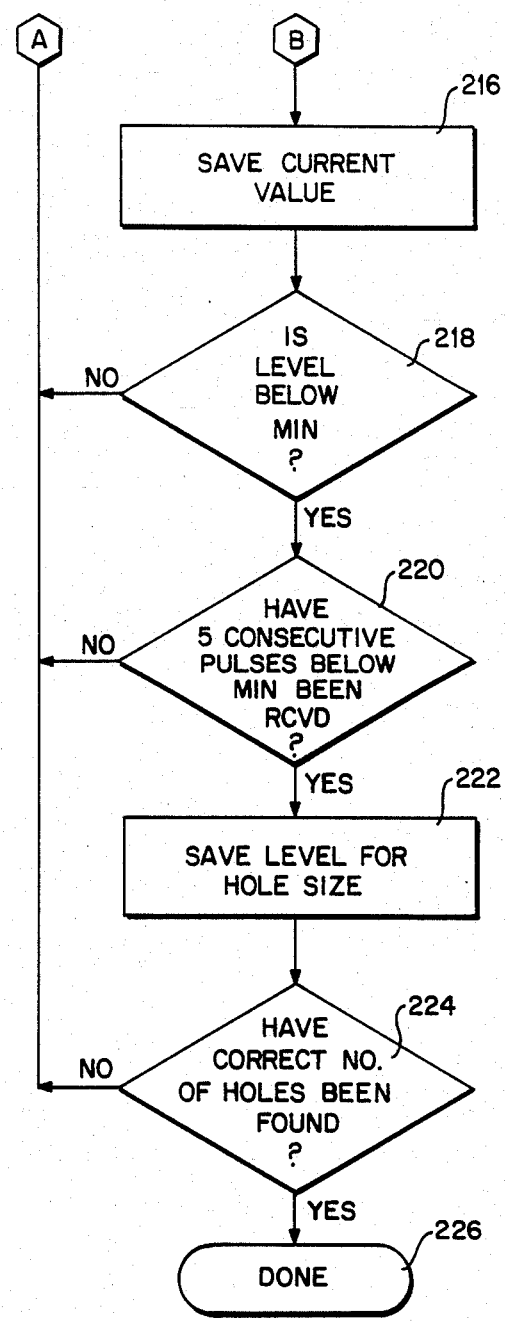
Figure 9:
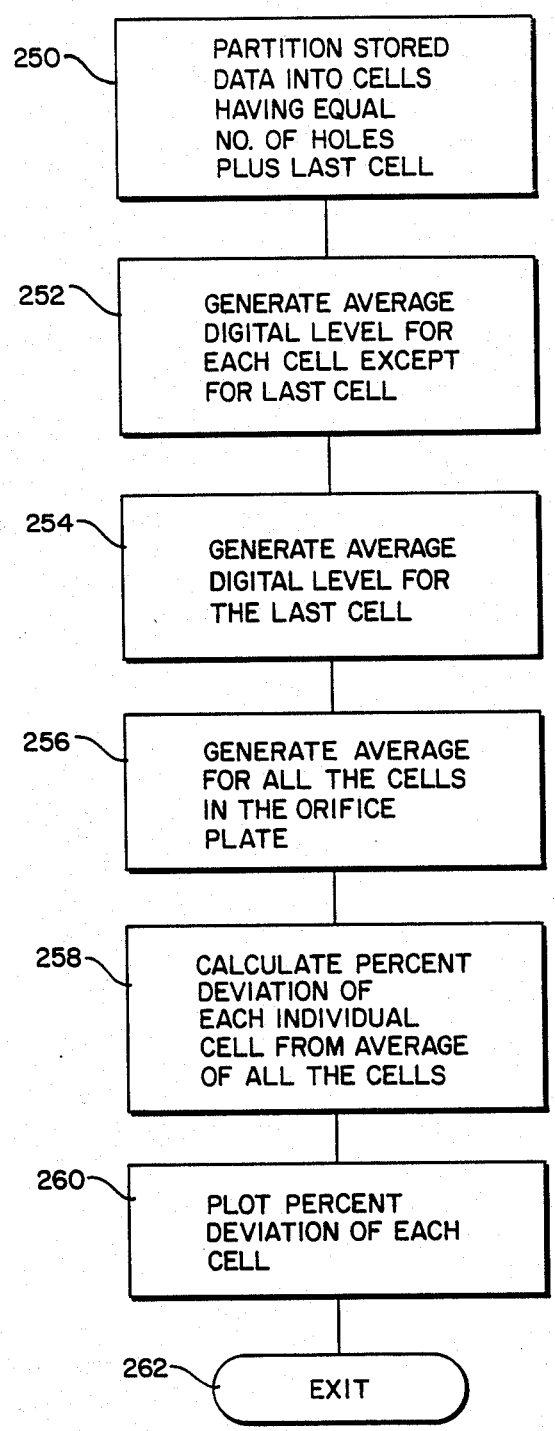
FIG. 9 is a flowchart which generally depicts the data processing operations involved in generating the plot shown in FIG. 10.

FIGS. 7 through 9 are flowcharts which delineate the general sequence of operations performed by computer 135 in controlling the apparatus shown in FIG. 6 and analyzing the data generated thereby. Turning first to the FIG. 7 detectors 118 and 120 and fires the laser S (as indicated by flowchart blocks 200 and 202). In this regard, it is noted that the peak detectors 118 and 120 are reset by the low level of the generated reset pulse. The firing sequence for laser S is triggered by the rising edge of the generated reset pulse, which actuates the aforementioned timing chain 138, 140, 142.

After the laser firing sequence has been triggered, data processor 135 checks to see whether the A to D conversion is complete. As dicussed above, the completion of the A to D conversion may be sensed by monitoring the "busy" pulse from A to D converter 134 (204).

If the A to D conversion is not yet complete, then a check is made to determine whether a programmed time-out has been reached (206). This programmed time-out way, for example, be on the order of 500 microseconds. If the programmed time-out has elapsed before the A to D conversion is completed, the laser is not functioning propertly and a stop scan signal is generated (208). The elapsing of the time-out indicates that there is not enough light emanating from laser S on the reference channel to trigger the analog to digital controller 136 to control the A to D converter 134 to digitize the received input signals. Thus, under such circumstances, the A to D conversion will never be completed. If, on the other hand, the programmed time-out has not yet been reached, then the routine branches back to block 204.

If the check at block 204 indicates that the A to D conversion has been completed, then a check is made to determine whether the digital word generated by the A to D converter 134 is greater than the above-mentioned minimum threshold signal level (210). If the output of A to D converter 134 is not greater than this level, then the routine branches back to block 200 to reset the peak detectors.

If the A to D output is greater than this minimum level, then a check is made to determine whether five consecutive pulses have been received which are greater than the minimum threshold level (212). If the check at 212 reveals that five such pulses have not been received, then the peak detectors are reset via block 200.

If five consecutive pulses have been received that are greater than the minimum threshold signal level, then a further check is made to determine whether the level of the current pulse is greater than the last received pulse (214). If the current pulse is not greater than the last pulse, then the routine branches back to block 200.

If the current pulse is greater than the last pulse, then the current value is saved as indicated at block 216 in FIG. 8. This current value is then compared with the threshold signal level and a check is made to determine whether the saved level is below the minimum level (218). If the saved current value is not below the minimum, then the routine once again branches back to block 200.

If the saved value is below the minimum, then a further check is made to determine whether five consecutive pulses have been received which are below the minimum threshold signal level (220). The practical effect of sensing five consecutive pulses which are below the minimum level is to establish that the optical scanning head is past the edge of the hole. If five consecutive pulses have not yet been received that are below the minimum, then the routine branches back to block 200.

If five consecutive pulses have been received which are below the minimum, then the level from block 216 is saved for hole size calculations (222). This level is the peak level detected for a given orifice.

Thereafter, a check is made to determine whether the correct number of holes have been found (224). In this regard, it is noted that any given orifice plate has a known number of orifices. This number will have been previously input to the data processor 135. If the correct number of holes have not yet been found, then the routine branches back to block 200. If the correct number of holes have been found, then the routine ends as indicated by block 226.

In accordance with the present invention, the stored orifice size data is further processed to allow a technician to very quickly determine the degree of uniformity of the holes in the orifice plate. More particularly, computer 135 may, for example, be programmed to generate a plot of the percentage that the orifice plate holes vary from an average orifice distributed over the length of the plate. In this regard, an exemplary orifice plate scan is shown in FIG. 10, with the abscissia representing inches along the length of the orifice plate. Since an orifice plate may have, for example, 72 orifices per inch, it should be appreciated that the plot reflects the recorded data in summary fashion. The upper portion of the scan reflects orifices which are larger than the average orifice. Correspondingly, the lower portion of the scan reflects orifices which are smaller than the average.

The orifice plate scan shown in FIG. 10 reveals a 5 to 6½% deviation of orifices near the center of the orifice plate. For many applications such a percentage deviation may indicate that the tested orifice plate is not acceptable. Thus, with such a scan, a technician can quickly and accurately evaluate the orifice plate without anywhere the tedium involved in a microscopic investigation of the orifices. It has been found that the data produced by such a plot correlates well with actual flow tests of the orifice plate using water deposited into chambers spaced along the width of the orifice plate.

The flowchart shown in FIG. 9 generally depicts the operations involved in generating such a plot. Initially, the stored data for all the orifices generated in accordance with the routine shown in FIGS. 6 and 7 are partitioned into a group of data blocks or cells. For example, data for an orifice plate which has somewhat less than 5,000 holes across its length, is partitioned into 70 cells with 70 holes allocated per cell. One final cell is also defined to include the remaining orifices (250).

Thereafter, an average digital level is determined for each of the cells except for the last cell (252). Then, an average digital level is likewise generated for the last cell (254).

An average is thereafter determined for all the cells in the orifice plate (256). The computer 135 then calculates the percentage deviation of each individual cell from the generated average for all the cells defined for the orifice plate (258).

A conventional plotter 149 is then controlled to plot the calculated percentage deviation of each cell from the average of all the cells (26) across the length of the orifice plate as shown in FIG. 10. As will be apparent to those skilled in the art, the plotter may be conventionally controlled, for example, using Hewlett Packard's graphics language.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for determining a dimensional characteristics of orifices in an orifice plate useful for fluid jet printing comprising:

means for mounting an elongated orifice plate;

optical light emitting and detection means including a light source on one side of the orifice plate for directing light through the orifices thereof and a light detector on the opposite side of the orifice plate from the light source for receiving light directed through the orifices by said light source;

means for providing relative movement of said optical means and said mounting means for directing light through the orifices for detection by said detector;

said light detctor being operable to generate signals proportional to the intensity of the light received through the orifice from said light source; and means for processing said signals to determine the dimensional characteristic of the orifices.

2. Apparatus according to claim 1 wherein said light source comprises a laser.

3. Apparatus according to claim 1 wherein said light source comprises a laser, said mounting means including an elongated frame having a pair of guide rails, a carriage mounted for movement along said frame including a pair of guide blocks for movement along said rails, means for moving said carriage along said frame including an endless belt and a pair of pulleys, means for coupling said belt and said carriage one to the other, and means for driving one of said pulleys to move said carriage along said frame, said laser being mounted on said carriage for movement therewith along one side of said plate, said light detector being carried by said carriage on the opposite side of said plate.

4. Apparatus according to claim 1 wherein said mounting means includes an elongated frame, a carriage mounted for movement along said frame, said optical light emitting and detection means being carried by said carriage for movement therewith, and means for moving said carriage along said frame.

5. Apparatus according to claim 4 wherein said moving means includes an endless belt and a pair of pulleys, means for coupling said belt and said carriage one to the other, and means for driving one of said pulleys to move said carriage along said frame.

6. Apparatus according to claim 4 wherein said frame includes a pair of guide rails, said carriage including a pair of guide blocks for movement along said guide rails.

7. Apparatus according to claim 4 wherein said light source comprises a laser mounted on said carriage for movement along one side of the orifice plate, said light detector being carried by said carriage on the opposite side of the orifice plate.

8. A method for determining a dimensional characteristic of an orifice in an orifice plate useful for fluid jet printing comprising the steps of:

disposing a light source on one side of the orifice plate for directing light through an orifice thereof;

disposing a light detector on the opposite side of the orifice plate for receiving light passing through each orifice from said light source;

generating an electrical signal proportional to the intensity of the light received through each orifice; and processing said electrical signal to determine the dimensional characteristic of the orifice.

9. A method according to claim 8 wherein said light source and said light detector form part of an optical scanning head, and further including the step of relatively moving said scanning head and the orifice plate for determining the dimensional characteristics of the orifices through said plate.

10. A method according to claim 9 wherein the light source comprises a laser, including the steps of disposing the orifice plate on a fixed frame, disposing the light source and the detector on a carriage movable relative to said frame, and moving said carriage relative to said frame such that said light source and said detector traverse the orifice plate mounted on said frame.

11. Apparatus for automatically determining the uniformity of the apertures in a member having an array of apertures comprising:
holding means for disposing an energy source adjacent said array of apertures;
means for moving said apertures and said energy source relative to one another;
means for sensing the amount of energy passing through individual ones of said apertures and for generating electrical signals indicative of the energy passing through each aperture thereof; and
processing means responsive to said electrical signals for generating signals indicative of the degree of uniformity of the apertures in said array.

12. Apparatus according to claim 11 wherein said member is a fluid jet applicator orifice plate.

13. Apparatus according to claim 11 wherein said processing means includes data processing means for evaluating said electrical signals for determining at least the individual aperture relative size.

14. Apparatus according to claim 11 wherein said processing means include data processing means for generating a pilot reflecting the degree of variation of apertures over the length of the array of apertures.

15. Apparatus according to claim 11 wherein saie energy source is a laser.

16. Apparatus according to claim 15 wherein said laser is a pulse laser.

17. Apparatus according to claim 11 wherein said processing means includes means for generating signals indicative of the degree of uniformity of the apertures in said member in accordance with a predetermined scale; and
means for generating a mid-scale reading if a given aperture size matches a predetermined reference aperture size.

18. Apparatus according to claim 17 wherein said means for generating a mid-scale reading includes a $+2$ gain stage.

19. Apparatus according to claim 11 wherein said processing means includes:
processing channel means for processing analog signals generated by said means for sensing;
analog to digital converter means for receiving processed analog signals and for generating digital signals indicative of the degree of uniformity of the apertures in the array; and
control means coupled to said analog to digital converter means for analyzing the digital signals from said analog to digital converter means and for generating processing control signals.

20. Apparatus according to claim 19 wherein said processing channel means includes:

amplifying means for amplifying signals generated by said means for sensing; and
peak detecting means for sampling and storing the peak signals generated by said amplifying means.

21. Apparatus according to claim 20 wherein said amplifying means includes adjustable gain amplifying means for generating a normalized output signal, whereby the gain of said amplifying means may be adjusted to calibrate said amplifying means with respect to a predetermined reference aperture size.

22. Apparatus according to claim 20 wherein said amplifying means includes preamplifer means disposed adjacent to said means for sensing for amplifying said electrical signals;
means for transmitting said amplified signals; and
receiver amplifier means coupled to said means for transmitting for further amplifying the transmitted signals.

23. Apparatus according to claim 22 wherein said means for transmitting includes twisted pair means for transmitting said amplified signals while reducing noise transmission.

24. Apparatus according to claim 19 wherein said means for sensing includes holes photodetector means for sensing the amount of energy passing through said apertures; reference photodetector means disposed adjacent said source of energy for generating reference signals; wherein said processing channel means includes a hole detecting processing channel means coupled to said hole photodetector means for processing generated electrical signals; and a corresponding reference detecting channel processing means for processing said reference signals.

25. Apparatus according to claim 24 further including calibration means for adjusting at least one operating parameter in said hole detecting processing channel means and said reference detecting channel processing means for calibrating said apparatus with respect to an aperture having predetermined reference dimensions.

26. Apparatus according to claim 25 wherein said calibration means includes:
means for monitoring the voltage at corresponding points in said hole detecting processing channels means and said reference detecting channel processing means; and
means for adjusting the voltage at at least one of said corresponding points such that the respective voltages at said corresponding points have a predetermined relationship to thereby normalize the hole detecting channel processing means with respect to a predetermined reference hole size, whereby when subsequent apertures are inspected, any deviation from said predetermined relationship indicates that the aperture varies from said predetermined reference hole size.

27. Apparatus according to claim 26 wherein said calibration means include attenuator means for controllably adjusting the amount of energy which may be detected by said reference photodetector means.

28. Apparatus according to claim 26 wherein said processing means includes:
means for generating signal indicative of the degree of uniformity of the apertures in said member in accordance with a predetermined scale; and
resolution magnifier means responsive to said electrical signals for adjustably modifying said predetermined scale, whereby small differences between sensed electrical signals from a given aperture and from a reference aperture may be magnified to allow small deviations in uniformity to be closely inspected.

29. Apparatus according to claim 19 wherein said control means includes data processing means coupled to said analog to digital converting means for analyzing said digital signals and for generating data indicative of aperture uniformity in said array of apertures.

30. Apparatus according to claim 29 wherein said data processing means includes:
means for storing digital signals generated by said analog to digital converter means;
means for storing a threshold signal level corresponding to a minimal energy detection level;
said means for storing including means for storing digital signals from said analog to digital converter means only after a predetermined number of consecutive signals are received which exceed said threshold signal level until a predetermined number of consecutive signals are received which have decreasing pulse intensity.

31. Apparatus according to claim 29, wherein said data processing means includes means for storing the peak signals detected for each of said apertures.

32. Apparatus according to claim 31 wherein said data processing means includes:
means for storing a digital word received from said analog to digital converter means;
means responsive to the storing of said digital word for generating a reset signal; and
wherein said processing channel means includes means responsive to said reset signal for clearing the processing channel means to permit further data to be processed.

33. Apparatus according to claim 32 wherein said control means further includes analog to digital control means responsive to said reset signal and a signal from said processing channel means for controlling said analog to digital converter means to digitize input analog signals.

34. Apparatus according to claim 32 wherein said control means further includes timing means responsive to said reset signal for controllably energizing said energy source.

35. Apparatus according to claim 34 further including means coupled to said timing means and said processing channel means for generating an error signal if data is being generated too fast to be gathered.

36. A method for automatically determining in a measurement system the uniformity of the apertures in a member having an array of apertures comprising the steps of:
disposing an energy source adjacent said array of apertures;
moving said apertures and said energy source relative to one another;
sensing the amount of energy passing through individual one of said apertures and generating electrical signals indicative of the energy passing through each aperture; and
processing said electrical signals to generate signals indicative of the degree of uniformity of the apertures in said array.

37. A method according to claim 36 wherein said member is a fluid jet applicator orifice plate.

38. A method according to claim 36 wherein said processing step further includes the steps of:
generating signals indicative of the degree of uniformity of apertures in said member in accordance with a predetermined scale; and
modifying said predetermined scale, whereby small differences between sensed electrical signals from a given aperture and from a reference aperture may be magnified to allow small deviations in uniformity to be closely inspected.

39. A method according to claim 36 wherein said processing step includes the step of evaluating said electrical signals for determining at least the individual aperture relative size.

40. A method according to claim 36 wherein said processing step includes the step of generating a plot reflecting the degree of variation of apertures over the length of the array of apertures.

41. A method according to claim 36 wherein said energy source is a laser.

42. A method according to claim 41 wherein said laser is a pulse laser.

43. A method according to claim 36 wherein said processing step further includes the steps of:
generating signals indicative of the degree of uniformity of the apertures in said member in accordance with a predetermined scale; and
generating a mid-scale reading if a given aperture size matches a predetermined reference aperture size.

44. A method according to claim 43 wherein said processing step further includes the step of:
storing digital signals generating by an analog to digital converter means;
storing a threshold signal level corresponding to a minimal energy detection level;
said step of storing digital signals further including storing digital signals from said analog to digital converter means only after a predetermined number of consecutive signals are received which exceed said threshold signal level.

45. A method according to claim 36 wherein said processing step includes:
processing the analog electrical signals generated by said means for sensing;
generating, in response to the processed analog signals, digital signals indicative of the degree of uniformity of the apertures in the array; and
analyzing the digital signals and generating processing control signals.

46. A method according to claim 45 wherein the step of processing the analog electrical signals includes:
amplifying the generated analog electrical signals; and
sampling and storing the peak signals generated by said amplifying step.

47. A method according to claim 46 wherein said amplifying step further includes:
adjusting the gain of at least one amplifying means to generate a normalized output signal, whereby the gain of said at least one amplifying means may be adjusted to calibrate said amplifying means with respect to a predetermined reference aperture size.

48. A method according to claim 45 wherein said sensing step includes sensing the amount of energy passing through said apertures via a photodetector disposed adjacent said apertures;
disposing a reference photodetector adjacent said source of energy to generate reference signals; and
wherein said processing step further includes utilizing a hole detecting processing channel means coupled to said hole photodetector means for processing electrical signals generated by said hole photodetector means, and a corresponding reference detecting channel processing means coupled to said reference photodetector means for processing said reference signals.

49. A method according to claim 48, further including the step of adjusting at least one operating parameter in said hole detecting processing channel means and said reference detecting channel processing means to thereby calibrate said measurement reference dimensions.

50. A method according to claim 49 wherein said adjusting step includes the steps of:
monitoring the voltage at corresponding points in said hole detecting processing channel means and said reference detecting channel processing means; and
adjusting the voltage at at least one of said corresponding points such that the respective voltages at said corresponding points have a predetermined relationship to thereby normalize the hole detecting channel processing means with respect to a predetermined reference hole size, whereby when subsequent apertues are inspected, any deviation from said predetermined relationship indicates that the aperture varies from said predetermined reference hole size.

51. A method according to claim 45 wherein said analyzing step includes the step of utilizing a data processing means to analyze said digital signals and to generate data indicative of aperture uniformity in said array of apertures.

52. A method according to claim 51 wherein said analyzing step includes the step of storing the peak signal detected for each of said apertures.

53. A method according to claim 51 wherein the utilizing step includes the steps of:
storing a digital word received from an analog to digital converter means;
generating a reset signal in response to said received digital word; and
clearing the processing channel means to permit further data to be processed.

54. A method according to claim 53 further including the step of controllably energizing said energy source in response to said reset signal.

55. A method according to claim 54 further including the step of generating an error signal if data is being generated too fast to be gathered.

* * * * *

UNITED STATES PATENT AND TRADEMARK OFFICE
CERTIFICATE OF CORRECTION

PATENT NO. : 4,833,623

DATED : May 23, 1989

INVENTOR(S) : Timothy H. V. Archer; Roger C. Burchett; John L. Dressler; Greg S. Wood It is certified that error appears in the above-identified patent and that said Letters Patent is hereby corrected as shown below:

In Figure 6, the analog/digital converter 134 now marked "A/O" should be marked --A/D--.

Column 1, line 24, "catched" should be --catcher--; line 39, "±1178%" should be --±1.5%--.

Column 2, line 59, "characteristic" should be --characteristics-

Column 4, line 3, "reaved" should be --reeved--; line 20, "carie should be --carried--; line 29, "opposite" should be --opposition--.

Column 5, line 17, "FIG. 5" should be --FIG. 6--; line 25, "±1178%" should be --±1.5%--; line 42, "mm" should be --nm--; line 50, --a-- should be inserted between "for" and "1.3"; line 53, "provided" should be --provide--.

Column 7, line 22, "is" should be --are--; line 50, "orifices" should be --orifice--.

Column 9, line 55, "at" should be --a--; line 64, the expression --flowchart, initially computer 135 resets the peak-- should be inserted between "FIG. 7" and the word "detectors".

UNITED STATES PATENT AND TRADEMARK OFFICE
CERTIFICATE OF CORRECTION

PATENT NO. : 4,833,623

DATED : May 23, 1989

INVENTOR(S) : Timothy H. V. Archer; Roger C. Burchett; John L. Dressler; Greg S. Wood It is certified that error appears in the above-identified patent and that said Letters Patent is hereby corrected as shown below:

Column 10, line 12, "way" should be --may--.

Column 11, line 41, "FIGS. 6 and 7" should be --FIGS. 7 and 8--.

Column 12, lines 4 and 5, "characteristics" should be --characteristic--.

Column 13, line 38, "pilot" should be --plot--; line 40, "saie" should be --said--.

Column 14, line 62, "signal" should be --signals--.

Column 16, line 30, "generating" should be --generated--.

Column 17, line 25, "apertues" should be --apertures--.

Signed and Sealed this

Nineteenth Day of March, 1991

Attest:

HARRY F. MANBECK, JR.

Attesting Officer     Commissioner of Patents and Trademarks